United States Patent [19]

Gaiser

[11] Patent Number: 4,510,752
[45] Date of Patent: Apr. 16, 1985

[54] MASTER CYLINDER

[75] Inventor: Robert F. Gaiser, Stevensville, Mich.
[73] Assignee: The Bendix Corporation, Southfield, Mich.
[21] Appl. No.: 282,346
[22] Filed: Jul. 10, 1981
[51] Int. Cl.³ .............................................. B60T 11/20
[52] U.S. Cl. ...................................... 60/562; 92/170; 92/171; 92/222; 92/248
[58] Field of Search ..................... 60/562; 92/171, 170, 92/222, 248

[56] References Cited

U.S. PATENT DOCUMENTS

| 3,040,712 | 6/1962 | Harrah | 92/248 |
| 3,513,655 | 5/1970 | Reznicek | 60/562 |
| 3,555,822 | 1/1971 | Rivetti | 60/562 |
| 3,561,215 | 2/1971 | Krusemark | 60/562 |
| 3,701,257 | 10/1972 | Gaiser | 60/562 |
| 3,848,518 | 11/1974 | Martin | 92/107 |

FOREIGN PATENT DOCUMENTS

| 848597 | 9/1960 | United Kingdom | 60/562 |
| 2017240 | 10/1979 | United Kingdom | 60/562 |

Primary Examiner—Abraham Hershkovitz
Attorney, Agent, or Firm—Paul David Schoenle; Ken C. Decker

[57] ABSTRACT

A master cylinder includes a housing (24) forming a bore (26) for receiving a first piston (38) and a second piston (40). Each piston is movable during braking to generate fluid pressure within a first pressure chamber (54) and a second pressure chamber (58), respectively. The first piston (38) is made from a stamping to define a uniform thin wall therefor. The stamped piston (38) forms a longitudinal body (84) movable relative to a fixed lip seal (32) and a base (86) defining a pocket (88) for receiving an input member (22).

4 Claims, 1 Drawing Figure

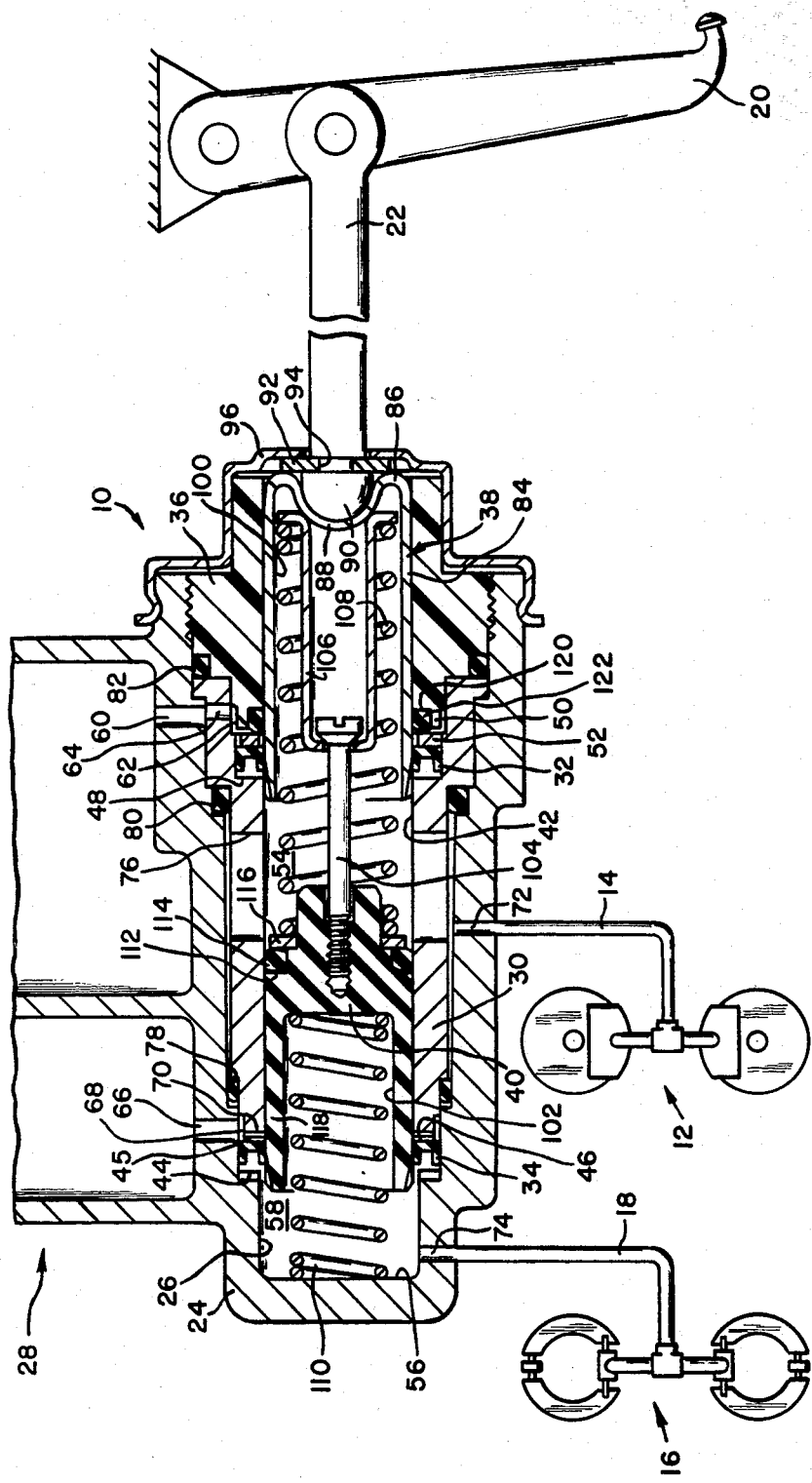

MASTER CYLINDER

This invention relates to a master cylinder wherein a pair of pistons are movably disposed within a housing in order to communicate fluid pressure during braking to a separate pair of brake circuits. In particular, the invention relates to a displacement type master cylinder wherein the pair of pistons are movable relative to a pair of fixed seals to displace fluid from a pair of pressure chambers.

In a displacement type master cylinder such as illustrated in my U.S. Pat. No. 4,249,381, issued Feb. 10, 1981, the pair of pistons are movable by an input member to displace fluid pressure from the pair of pressure chambers. One of the pair of pistons is a machined part and the other piston is a stamped part. The one piston engages the input member and requires a block or spacer to connect the input member thereto while the other piston which is stamped also requires machining to form a fluid passage from one of the pressure chambers to its associated brake circuit.

The present invention provides a master cylinder having a housing (24) defining an axially extending bore (26), a first piston (38) movable within the bore by an input member (22) engaged therewith, and a second piston (40) movably disposed within the bore and cooperating with the first piston to form a first pressure chamber (54), the second piston (40) also cooperating with the housing (24) to form a second pressure chamber (58), characterized by said first piston (38) comprising a thin walled cup shaped member with a longitudinal body (84) extending axially from a base (86), said longitudinal body defining a cavity (100) forming a portion of said first pressure chamber (54), and said cup shaped member being stamped to form a substantially uniform dimension for said thin wall.

It is an advantage of the present invention that a stamped first piston is provided to absorb the impact of the input member while a lightweight and economical second piston is provided from a plastic molded part.

It is a further advantage of the present invention that a sleeve, which is disposed within the housing bore, can be simplified to provide a substantially uniform bore between the first and second pistons or between a pair of seals engageable respectively with the first and second pistons.

The sole FIGURE is a schematic illustration of a brake system with a master cylinder construction in accordance with the present invention illustrated in cross section.

In the brake system, a master cylinder 10 is coupled to a first brake circuit 12 via conduit 14 and also to a second brake circuit 16 via conduit 18. A brake pedal 20 is connected to the master cylinder via an input member 22. The master cylinder defines a housing 24 with an axially extending bore 26 and an integrally formed reservoir 28, although the reservoir may be formed by a plastic container as is well known in the art.

Within the axially extending bore 26, a sleeve 30 is fixedly disposed to define fixed positions for a first lip seal 32 and a second lip seal 34. A bearing 36 is threadably connected to the housing to hold the sleeve 30 within the bore 26. A first piston 38 is movably disposed within the bearing 36 and the bore 26 and a second piston 40 is also movably disposed within the bore 26. Both pistons 38 and 40 are also movably disposed within a bore 42 defined by the sleeve 30. The bore 26 is stepped to form a shoulder 44 which cooperates with the slotted end 46 of the sleeve 30 to locate the second lip seal 34 within the bore 26. A spacer 45 separates the lip seal 34 from the slotted end of the sleeve. The sleeve 30 is stepped to form a shoulder 48 which cooperates with the end 50 of bearing 36 and a spacer 52 to locate the first lip seal 32 within the bore 42. The first piston 38 and the second piston 40 cooperate to substantially define a first pressure chamber 54 and the second piston 40 cooperates with the end wall 56 of housing 24 to form a second pressure chamber 58. A compensation port 60 leads to a clearance 62 between the bearing 36 and the sleeve 30 via sleeve opening 64, and the clearance 62 communicates past spacer 52 and lip seal 32 to communicate the reservoir 28 with the first pressure chamber 54. Similarly a compensation port 66 communicates with clearance 68 between the end 46 of sleeve 30 and the wall of bore 26 via sleeve radial slots 70 in order to communicate the reservoir 28 past lip seal 34 to the second pressure chamber 58. Each pressure chamber 54 and 58 communicates respectively with conduit 14 and 18 via outlet ports 72 and 74. The sleeve 30 is provided with slots 76 communicating the first pressure chamber 54 with the outlet port 72. A plurality of O-ring seals 78, 80 and 82 seal the sleeve 30 to the wall of bore 26 to isolate the communication paths between the reservoir and the pressure chambers.

In accordance with one of the features of the invention, the first piston 32 is formed in an aluminum or steel stamping operation so that its thickness is substantially uniform. The stamping operation forms a longitudinal body 84 extending axially from a base 86. The base 86 is provided with a pocket 88 during the stamping operation and the pocket 88 receives the end 90 of input member 22. In order to prevent separation between the input member 22 and the first piston 38, the input member 22 carries a retainer 92 within a recess 94 and a cover 96 is releasably coupled to the housing 24 and engageable with the retainer 92 to prevent movement of the input member 22 away from the first piston 38. When the housing 24 is fixedly mounted to a support such as a fire wall or booster housing (not shown) the cover 96 will be trapped between the fire wall or booster and the housing 24.

In accordance with another feature of the present invention, the second piston 40 is formed by a plastic mold. Consequently, the material for each piston 38 and 40 is different. Both pistons are formed as cup shaped members with a first cavity 100 within piston 38 forming a portion of the first pressure chamber 54 and a second cavity 102 within piston 40 forming a portion of the second pressure chamber 58. Each cavity 100 and 102 opens toward their associated pressure chamber. The molded piston 40 is coupled to a stem 104 which carries a hat 106 and a first retraction spring 108 biases the hat to its extended position on the stem. A second retraction spring 110 biases the second piston 40 toward the first piston 38 so that the first retraction spring 108 maintains the hat 106 in engagement with the base 86. The pocket 88 extends into the hat 106 to substantially center the hat 106 and the retraction spring 108 within the cavity 100.

The molded plastic second piston 40 is provided with a shoulder 112 and a seal 114 is disposed between the shoulder and a spring stop 116 cooperating with the first retraction spring 108. The spring 108 generates a greater spring force than the spring 110. The seal 114 slidably engages the bore 42 of sleeve 30 and the bore 42 is uniform between the lip seals 32 and 34. The seal 114 prevents communication between the first pressure chamber 54 and the reservoir 28 via slot 46 and opening 66. As mentioned earlier, the molded plastic piston is cup shaped so that a longitudinally extending body 118 is slidably engageable with the sleeve 30 between the end 46 of the sleeve and the slots 76. Consequently, the sleeve 30 substantially limits the radial deflection of the plastic body 118 in response to fluid pressure in the second pressure chamber.

The bearing end 50 is stepped to form a shoulder 120 and a seal 122 is disposed between the shoulder 120 and the spacer 52 to sealingly engage the first piston 38.

In an alternative embodiment (not shown) the second piston 40 could be replaced with a conventional stamped piston as shown in U.S. Pat. No. 4,249,381, so that both pistons would form cavities facing each other.

There are many variations to the present invention which are feasible by one skilled in the art and as such are covered by the scope of the appended claims.

I claim:

1. A master cylinder for a brake system having a housing defining an axially extending bore, a first piston movable within the bore by an input member engaged therewith, and a second piston movably disposed within the bore and cooperating with the first piston to form a first pressure chamber, the second piston also cooperating with the housing to form a second pressure chamber, characterized by said first piston comprising a thin walled cup shaped member with a longitudinal body extending axially from a base, said longitudinal body defining a cavity forming a portion of said first pressure chamber, said cup shaped member being stamped from a metal to form a substantially uniform dimension for said thin wall, said second piston being made from a molded plastic whereby the master cylinder provides different materials for said first and second pistons, and said first and second pistons are made by different processes, the housing including a sleeve fixedly disposed within the bore in order to define fixed positions for a first lip seal engaging the first piston and a second lip seal engaging the second piston, said sleeve defining a uniform diameter bore between said first and second lip seals and said first and second pistons slidably engage the wall of said uniform diameter bore.

2. A master cylinder comprising, in combination, a housing defining an axially extending bore therein, a first piston movably disposed within the bore, a second piston movably disposed within the bore and cooperating with the first piston to form a first pressure chamber, the second piston also cooperating with the housing to form a second pressure chamber, the first piston substantially defining a first cup shaped member which is stamped from a metal to provide a uniform thin wall therefore, the first cup shaped member enclosing a first cavity forming a portion of the first pressure chamber, the second piston substantially defining a second cup shaped member which is molded from a plastic material, the second cup shaped member enclosing a second cavity forming a portion of the second pressure chamber, a first spring assembly disposed within the first cavity and cooperating with the first and second pistons to oppose relative movement therebetween during braking, a second spring assembly within the second cavity opposing relative movement between the second piston and the housing during braking, a sleeve disposed within the housing bore to fixedly position a first lip seal engageable with the first piston and a second lip seal engageable with the second piston, the second piston carrying a seal which slidably engages the sleeve to approach the second lip seal during braking when the second piston is moving, and the sleeve defines a portion with a uniform diameter bore extending axially from the first lip seal to the second lip seal.

3. The master cylinder of claim 2 in which the cup shaped second piston defines a longitudinally extending body and the outer surface of the body is slidably engageable with the sleeve uniform diameter bore over a substantial longitudinal length of said sleeve.

4. The master cylinder of claim 2 in which the sleeve defines at least one slot communicating the first pressure chamber with a brake circuit and the seal is engageable with the sleeve uniform diameter bore adjacent the one slot in a rest position.

* * * * *